United States Patent [19]
Tsuzaki et al.

[11] Patent Number: 5,972,410
[45] Date of Patent: *Oct. 26, 1999

[54] ROASTED SOYBEAN HYPOCOTYLS AND BEVERAGE MATERIAL CONTAINING THE SAME

[75] Inventors: Shinichi Tsuzaki; Mitsuo Ezaki, both of Izumisano; Kiyoharu Takamatsu, Sennan-gun; Takaharu Matsuo, Sennan, all of Japan

[73] Assignee: Fuji Oil Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/954,204

[22] Filed: Oct. 20, 1997

[30] Foreign Application Priority Data

Nov. 5, 1996 [JP] Japan .................................. 8-292492
Dec. 27, 1996 [JP] Japan .................................. 8-349886

[51] Int. Cl.[6] .............................. A23F 3/00; A23L 2/38; A23L 1/20; A23B 4/03
[52] U.S. Cl. ......................... 426/598; 426/597; 426/634; 426/466
[58] Field of Search ................................... 426/634, 598, 426/597, 466

[56] References Cited

FOREIGN PATENT DOCUMENTS 0 704 166 A1  3/1996  European Pat. Off. .
4-93642       3/1992  Japan .
10-4904       1/1998  Japan .

OTHER PUBLICATIONS

Barnes et al. Nutr. Cancer, 21, 113–131, 1994.
Watanabe et al., Journal of Epidemiology, 3, 47–61, 1993.
Japanese Unexamined Patent Publication No. 86644/1979 published on Jul. 10, 1997 and its English abstract.
Japanese Unexamined Patent Publication No. 67161/1989 published on Mar. 13, 1989 and its English abstract.
Japanese Examined Patent Publication No. 32990/1991 published on May 15, 1991 and its English abstract.
Database Abstract. AN: 94(07):H0119 FSTA for International Food Ingredients, No. 3, pp. 37–42, 1994. Author: Bomio.
Database Abstract. AN 95–149631 [20] WPIDS for JP 06284880. Patent Applicant: Nakayama, Oct. 1994.
Database Abstract. AN 84–046077 [08] WPIDS for JP 59006869. Patent Applicant Hitachiya, Jan. 1994.
Database Abstract. AN 97–342256 [32] WPIDS for CN 1107012. Inventors: Hu et al, Aug. 1995.
Database Abstract. AN 93(10):H0139 FSTA for EP 543051. Inventor: Honsha, 1993.

*Primary Examiner*—Anthony J. Weier
*Attorney, Agent, or Firm*—Armstrong, Westerman, Hattori, McLeland & Naughton

[57] ABSTRACT

The invention provides a beverage material having roasted soybean hypocotyls which are substantially free of soybean testae and at least one other member from the group of roasted soybean testae, roasted barley, roasted naked barley, roasted Job's-tears and green tea. The beverage material can be prepared using soybean hypocotyls substantially free of soybean testae with the material retaining active ingredients such as isoflavone and having a good flavor.

12 Claims, No Drawings

ROASTED SOYBEAN HYPOCOTYLS AND BEVERAGE MATERIAL CONTAINING THE SAME

FIELD OF THE INVENTION

The present invention relates to roasted soybean hypocotyls and a beverage material containing the same.

PRIOR ART

Soybeans contain large amounts of glycoside components such as isoflavone, saponin and the like as compared with other cereals. Soybean hypocotyls which are plumules or radicles in germination contain glycoside components in high concentrations.

Recently it was reported that isoflavone can inhibit breast cancer, prostatic cancer, large bowel cancer and the like (Barnes et al, Nutr. Cancer, 21, 113–131, 1994). The intake of soybean products is reportedly in an inverse proportion to a risk of cancer from the viewpoint of epidemiology (Watanabe et al., J. Epidemiology, 3, 47–61, 1993). These components are also known to have physiological functions including the prevention of osteoporosis and retardation of oxidation as well as inhibition of cancers. However, soybean hypocotyls (which may be hereinafter called "hypocotyls") have undesirable flavor compared with the other soybean components such as testae and bean-curd refuse. Further, isoflavone has a drawback of being easily lost on contact with hot water.

Hypocotyls are left as a residue together with soybean testae (which may be hereinafter called "testae"), bean-curd refuse and the like in the processing of soybeans, as in oil expression, production of soybean milk, manufacture of bean curd (tofu) and preparation of separated soybean protein. When hypocotyls are used for edibles, it is necessary to alleviate or eliminate the offensive flavor from the hypocotyls. Some methods have been proposed for alleviation or elimination of unpleasant flavor. For example, the proposals include a method in which germinated soybeans are roasted (Japanese Unexamined Patent Publication No.86644/1979), a method wherein soybeans are roasted after immersion in an alkali solution (Japanese Unexamined Patent Publication No.67161/1989), etc. But problems were posed by these methods involving roasting of germinated soybeans or soybeans immersed in water. For example, the method converts a glycoside as an active ingredient or easily causes a change as in properties on heating due to the presence of water. It is also known to mix roasted hypocotyls and testae with roasted grape seeds (Japanese Examined Patent Publication No.32990/1991). But this method presents a problem that since hypocotyls and testae are roasted as mixed together, the testae are not fully roasted and the mixture affords an undesirable flavor.

For these reasons, hypocotyls have scarcely been used in food applications. Currently the most of hypocotyls are disposed of without separation from testae, or they are used as feeds for domestic animals.

DISCLOSURE OF THE INVENTION

A primary object of the present invention is to provide a flavory beverage material which is prepared using soybean hypocotyls without substantial loss of active ingredients such as isoflavone.

Another object of the invention is to provide a flavory beverage material which is prepared using roasted soybean hypocotyls and which is well balanced in sweetness, pleasant aroma, smell, astringent taste and so on.

The inventors conducted extensive research to achieve the foregoing objects and found the following. When hypocotyls are separated from soybeans with heating by dry heat and roasted so as to give a specific color, the obtained material retains active components such as isoflavone in a satisfactory degree and has a pleasant flavor. When roasted hypocotyls are mixed with at least one member selected from the group consisting of roasted testae, roasted barley, roasted naked barley, roasted Job's-tears and green tea, a flavory beverage material can be obtained which is well balanced in sweetness, pleasant aroma, smell, astringent taste and so on. The present invention was completed based on these novel findings.

According to the present invention, there are provided roasted soybean hypocotyls which are 25 to 35 in L value and 4 to 13 in b value when measured with a color difference meter. According to the invention, there is also provided a process for preparing roasted soybean hypocotyls, the process comprising the steps of separating hypocotyls from soybeans with heating by dry heat, and roasting the separated hypocotyls until they are 25 to 35 in L value and 4 to 13 in b value when measured with a color difference meter.

According to the invention, there is further provided a beverage material comprising (i) roasted soybean hypocotyls which are 25 to 35 in L value and 4 to 13 in b value when measured with a color difference meter and (ii) at least one member selected from the group consisting of roasted testae, roasted barley, roasted naked barley, roasted Job's-tears and green tea.

Hypocotyls for use herein as the starting material are those substantially free of testae and retaining isoflavone and saponin.

The reasons for use of hypocotyls free of testae are as follows. Testae are different in composition from hypocotyls, for example in that testae contain less oil than hypocotyls. Further, testae are different in shape from hypocotyls. Thus, if hypocotyls containing testae are used, the following disadvantage occurs. When hypocotyls have been roasted to the best roasted state, testae have not reached a proper roasted state yet. In this case, the mixture smells grassy and is undesirable in flavor. When testae have reached the best roasted state, hypocotyls have been excessively roasted. In short, it is difficult to obtain testae and hypocotyls both having a good flavor.

The separation of hypocotyls from soybeans with heating by dry heat is a proper way to obtain hypocotyls as a raw material free of testae without loss of isoflavone or saponin. A preferred example of this method is disclosed in Japanese Examined Patent Publication No.48417/1992. When there is no specific limitation on the nitrogen soluble index (NSI) of a cotyledon to be separated which index is an index of thermal denaturation of soybean protein, it is possible to heat soybeans by dry heat at a soybean temperature of 70 to 100° C. whose range is wider than in said method. Stated more specifically, the testa-free hypocotyls retaining isoflavone and saponin can be prepared by a process comprising drying soybeans to a water content of about 12% or less, heating the dried soybeans by dry heat to a soybean temperature of 70° C. or higher, preferably 75 to 100° C., breaking and hulling the soybeans using a roll or a grinder with a plurality of grindstones spaced away wider than the diameter of soybeans, and separating hypocotyls from soybeans by means of wind selection and sieve separation.

Then the hypocotyls are roasted without contact with hot water or the like. The degree of roasting is such that the roasted hypocotyls have a color tone of 25 to 35 in L value and 4 to 13 in b value when measured with a color difference meter. The L value is an index representing the lightness of a color and the b value is an index indicating a yellowish color. Commercially available color difference meters are usable in the present invention (e.g. a product of Nippon Denshoku Kogyo Co., Ltd.).

When hypocotyls are roasted in the foregoing range of roasting degree, they give a good flavor without substantial loss of isoflavone, saponin and the like. After roasting, the hypocotyls contain at least 50% by weight of isoflavone based on said component in unroasted hypocotyls. Saponin and isoflavone are lost from unroasted hypocotyls on contact with hot water or the like. Therefore, caution is called for to avoid such contact.

Hypocotyls are roasted via a stage of yellowish color tone of 50 to 40 in L value and 20 to 15 in b value to the contemplated stage of color tone of 35 to 25 in L value and 4 to 13 in b value. The hypocotyls which fall short of the contemplated stage leave a grassy smell. On the other hand, the hypocotyls roasted beyond the contemplated stage is given a color tone of less than 25 in L value or less than 4 in b value, so that they smell burnt and taste bitter and harsh, affording an undesirable flavor. If hpocotyls are excessively roasted, their bioactive substances such as saponin and isoflavone are decreased even when they are roasted under dry heat condition to avoid contact with hot water. A more preferred range of b value is 5 to 10. However, when hypocotyls are mixed with other conventional roasted flavory components such as roasted barley or roasted naked barley, a blending effect is produced. In this case, hypocotyls which have a color tone of 35 to 25 in L value and 4 to 5 in b value are also preferred.

The roasting temperature is not specifically limited in the present invention insofar as the roasted hypocotyls have the contemplated color tone.

The roasting conditions are varied depending on the kind of roasting machine and on the amount of hypocotyls to be roasted and are properly determined such that the roasted hypocotyls have said ranges of L value and b value. For example, when proper heating conditions are heating at 60° C. for about 60 to about 160 minutes using a roasting machine adapted to roast hypocotyls on a shelf with a hot-air blasting means, the heating can be done at 180° C. in a short time of 30 to 60 minutes using a roaster capable of uniformly heating the hypocotyls by contact with a heat transfer plate, such as a rotary gas roaster.

Useful roasters can be any of those capable of heating hypocotyls by dry heat to about 100° C. or higher. Examples are gas roasters (e.g., a product of Fuji Royal Co., Ltd.), electric heating roasters (e.g., a product of Nihon Gaishi Co., Ltd.), hot air roasters (e.g., a product of Buhler Co., Ltd.) and so on.

When hypocotyls are compressed to a flat shape with a roller or the like, the roasting efficiency and extraction efficiency are improved, and good results are obtained. On the other hand, when hypocotyls are finely divided into particles, the roasting efficiency is enhanced but precipitates remain when extracted.

The roasted hypocotyls thus obtained have a plesant smell peculiar to soybeans. Consequently, the roasted hypocotyls can be used alone as a beverage material to be extracted with hot water, or can be used as a food material for confectionery.

However, the roasted hypocotyls used alone are slightly unsatisfactory in flavor as a whole and leave a specific sweetness in the mouth. When roasted hypocotyls are mixed with at least one member selected from the group consisting of roasted testae, roasted barley, roasted naked barley, roasted Job's-tears and green tea, the obtained material is rich in flavor and well balanced in sweetness, pleasant aroma, smell, astringent taste, etc.

There is no specific limitation on the amount of at least one component selected from the group consisting of roasted testae, roasted barley, roasted naked barley, roasted Job's-tears and green tea. The amount of such component is properly determined so as to obtain a pleasant flavor according to the kind of components. The amount is selected from a broad range of total amount of about 0.001 to about 30 parts by weight per part by weight of roasted hypocotyls. However, when the purpose is to effectively use a large amount of isoflavone and saponin and like bioactive substances present in roasted hypocotyls, it is desired to use said components in the total amount of about 4 parts by weight or less per part by weight of roasted hypocotyls.

Suitable roasted testae to be mixed with roasted hypocotyls can be prepared by roasting testae under conditions different from those for roasting hypocotyls so as to obtain a color tone of 35 to 28 in L value and 15 to 8.5 in b value. Testae, unless properly roasted, leave a grassy smell, whereas they, when excessively roasted, smell burnt and taste unpalatable. When testae are roasted under conditions different from those for roasting hypocotyls, the hypocotyls and testae are roasted separately, or alternatively testae are roasted first and then hypocotyls are added for subsequent roasting.

When roasted hypocotyls are used as mixed with roasted testae, the roasted testae are used in an amount of preferably about 4 parts by weight or less per part by weight of roasted hypocotyls to make effective use of bioactive substances such as isoflavone and saponin, or about 0.25 to about 1.5 parts by weight per part by weight of roasted hypocotyls to increase the flavor as well.

Barley, naked barley and Job's-tears can be roasted by conventional methods disclosed, for example, in Japanese Examined Patent Publications Nos. 12391/1965 and 3397/1973. Preferably they are roasted until they are colored a little brownish.

Barley and naked barley are used preferably in a germinated state from the standpoint of flavor. Barley gives a pleasant aroma, whereas naked barley imparts a plain bitter taste. Germinated Job's-tears are preferred from the viewpoint of flavor because they impart a smell peculiar to Job's-tears.

When green tea is added, its amount is about 0.001 to about 0.1 part by weight per part by weight of hypocotyls so as to produce a sweetness-masking effect. If more than 0.1 part by weight of green tea is used, a pleasant astringent taste and refreshed taste can be correspondingly imparted.

The roasted hypocotyls of the present invention have a good flavor and are less likely to lose isoflavone, saponin and the like. Consequently the roasted hypocotyls can be effectively used as a beverage material or a food material. When the roasted hypocotyls are mixed with at least one member selected from the group consisting of roasted testae, roasted barley, roasted naked barley, roasted Job's-tears and green tea, the mixture is well balanced in sweetness, pleasant aroma, smell, astringent taste, etc. and is useful as a beverage material for flavor-rich tea or the like. The isoflavone contained in soybeans can be easily ingested with gusto by taking said beverage material. Thus the beverage material contributes to the improvement of health.

Given below are Formulation Examples for preparing beverage materials having a well-balanced flavor and comprising the roasted hypocotyls of the invention and other components.

Formulation Example 1

A beverage material was prepared by mixing roasted hypocotyls with, per part by weight of roasted hypocotyls, 0.1 to 10 parts by weight, preferably 0.2 to 5 parts by weight, of roasted barley and/or roasted naked barley. A higher content of the roasted barley and/or roasted naked barley significantly increases the bitterness, whereas their lesser content reduces the bitterness.

Formulation Example 2

A beverage material was prepared by mixing roasted hypocotyls and roasted Job's-tears, the amount of roasted Job's-tears being 0.1 to 10 parts by weight, preferably 0.2 to 5 parts by weight, per part by weight of roasted hypocotyls. A higher content of the roasted Job's-tears increases the smell, whereas their lesser content decreases the smell.

Formulation Example 3

A beverage material was prepared by mixing roasted hypocotyls and green tea, the amount of of green tea being 0.001 to 10 parts by weight, preferably 0.002 to 5 parts by weight, per part by weight of roasted hypocotyls. A higher content of the green tea increases the astringent taste, whereas its lesser content decreases the astringent taste.

Formulation Example 4

A beverage material was prepared by mixing roasted hypocotyls with, per part by weight of roasted hypocotyls, 0.1 to 10 parts by weight of roasted barley and/or roasted naked barley and 0.1 to 10 parts by weight of roasted Job's-tears, preferably 0.2 to 5 parts by weight of roasted barley and/or roasted naked barley and 0.2 to 5 parts by weight of roasted Job's-tears.

Formulation Example 5

A beverage material was prepared by mixing roasted hypocotyls with, per part by weight of roasted hypocotyls, 0.1 to 10 parts by weight of roasted barley and/or roasted naked barley and 0.001 to 10 parts by weight of green tea, preferably 0.2 to 5 parts by weight of roasted barley and/or roasted naked barley and 0.002 to 5 parts by weight of green tea.

Formulation Example 6

A beverage material was prepared by mixing roasted hypocotyls with, per part by weight of roasted hypocotyls, 0.1 to 10 parts by weight of roasted Job's-tears and 0.001 to 10 parts by weight of green tea, preferably 0.2 to 5 parts by weight of roasted Job's-tears and 0.002 to 5 parts by weight of green tea.

Formulation Example 7

A beverage material was prepared by mixing roasted hypocotyls with, per part by weight of roasted hypocotyls, 0.1 to 10 parts by weight of roasted barley and/or roasted naked barley, 0.1 to 10 parts by weight of roasted Job's-tears and 0.001 to 10 parts by weight of green tea, preferably 0.2 to 5 parts by weight of roasted barley and/or roasted naked barley, 0.2 to 5 parts by weight of roasted Job's-tears and 0.001 to 0.1 part by weight (more preferably 0.002 to 0.05 part by weight) of green tea.

Formulation Example 8

A beverage material was prepared by mixing roasted hypocotyls with, per part by weight of roasted hypocotyls, 0.1 to 10 parts by weight of roasted barley and/or roasted naked barley, 0.1 to 10 parts by weight of roasted Job's-tears, and 0.1 to 10 parts by weight of green tea, preferably 0.2 to 5 parts by weight of roasted barley and/or roasted naked barley, 0.2 to 5 parts by weight of roasted Job's-tears and 0.2 to 5 parts by weight of green tea.

Formulation Example 9

A beverage material was prepared by mixing the same amounts of same components as used in Formulation Example 7 and other components such as cassia seed, lycium leaves, bamboo leaves and the like, the amount of the other components being 0.001 to 10 parts by weight, preferably 0.002 to 5 parts by weight, per part by weight of roasted hypocotyls.

EXAMPLES

The present invention is described below in more detail with reference to the following examples.

Example 1

A 50 kg quantity of soybeans were dried by hot air at a temperature of 70° C. for 30 minutes to adjust the water content to 11%. The dried soybeans were heated by dry heat at a soybean temperature of 83° C. using a fluidized bed drier, and were immediately broken and hulled with a grinder useful for manufacture of bean curd (tofu) (product of Kurihara Tekko Co., Ltd.). The broken beans were separated into 1 kg of hypocotyls and 4 kg of testae by means of wind selection and sieve separation.

The obtained hypocotyl specimen was placed onto a shelf and roasted by hot air at 160° C. The roasted specimen was partly collected with time to measure the color tone and the amounts of bioactive substances such as saponin, isoflavone and the like. The flavor was also evaluated.

The color tone was measured using a color difference meter (Z-II, OPTICAL SENSOR, product of Nihon Denshoku Kogyo Co., Ltd.). The saponin was extracted by the method of Kitagawa et al. (Pharmaceutical Journal (Yakugaku Zasshi) vol. 104, (2), 162–168, 1984) and analyzed by gas chromatography under the conditions of said method. The isoflavone was extracted by the foregoing method of Kitagawa et al. and the amounts thereof were measured by liquid chromatography under the conditions taught by Ohta et al (Journal of the Japanese Society for Food Science and Technology), vol.27, (7), 348–351, 1980). The activity of trypsin inhibitor was determined by BAPA method. The flavor was evaluated in respect of all of grassy smell, burnt smell and bitterness. The results were rated as excellent, good, fair and bad.

The amounts of saponin, isoflavone and trypsin inhibitor were expressed in relative values, namely the values obtained by calculating their amounts after roasting based on their amounts before roasting which were taken as 100.

The results are shown below in Table 1.

TABLE 1

| Roasting time (min) | L value | b value | Saponin | Isoflavone | Trypsin inhibitor | Flavor |
|---|---|---|---|---|---|---|
| 0 | 56.84 | 23.47 | 100 | 100 | 100.0 | Bad (grassy smell) |
| 30 | 45.43 | 17.74 | 100 | 100 | 48.4 | Bad (grassy smell) |
| 60 | 36.59 | 12.83 | 100 | 100 | 9.3 | Fair (slightly grassy smell) |
| 90 | 35.89 | 12.59 | 100 | 95 | 0 | Fair |
| 120 | 32.76 | 9.92 | 95 | 90 | 0 | Good |
| 140 | 30.19 | 9.47 | 95 | 90 | 0 | Good |
| 160 | 26.67 | 5.49 | 93 | 90 | 0 | Good |
| 180 | 24.46 | 4.60 | 90 | 80 | 0 | Bad (burnt smell/bitterness) |
| 210 | 22.60 | 3.59 | 77 | 70 | 0 | Bad (burnt smell/bitterness) |

As shown above, when roasted specimens retained at least 80% of each of saponin and isoflavone and had a trypsin inhibitor activity of zero and a good flavor, they were 25 to 35 in L value and 5 to 13 in b value.

Example 2

Soybean hypocotyls were roasted in the same manner as in Example 1 except that the roasting temperature was 170° C. Evaluations and measurements were made by the same methods as in Example 1. The results are shown in Table 2.

TABLE 2

| Roasting time (min) | L value | b value | Saponin | Isoflavone | Trypsin inhibitor | Flavor |
|---|---|---|---|---|---|---|
| 0 | 56.84 | 23.47 | 100 | 100 | 100.0 | Bad (grassy smell) |
| 60 | 35.86 | 11.10 | 100 | 100 | 13.0 | Fair |
| 70 | 33.06 | 9.96 | 95 | 90 | 0 | Good |
| 80 | 28.56 | 6.46 | 85 | 80 | 0 | Fair |
| 90 | 23.01 | 4.21 | 79 | 70 | 0 | Bad (burnt smell/bitterness) |

Soybean hypocotyls were roasted in the same manner as in Example 1 except that the roasting temperature was 180° C. Evaluations and measurements of the obtained materials were made. The results are shown in Table 3.

TABLE 3

| Roasting time (min) | L value | b value | Saponin | Isoflavone | Trypsin inhibitor | Flavor |
|---|---|---|---|---|---|---|
| 0 | 56.84 | 23.47 | 100 | 100 | 100.0 | Bad (grassy smell) |
| 30 | 37.00 | 12.89 | 100 | 100 | 10.8 | Bad (slightly grassy smell) |
| 40 | 30.12 | 9.50 | 92 | 88 | 0 | Good (good flavor) |
| 50 | 24.34 | 4.55 | 78 | 65 | 0 | Bad (burnt smell/bitterness) |
| 60 | 18.76 | 3.02 | 45 | 39 | 0 | Bad (burnt smell/bitterness) |

As shown above, with an increase in roasting temperature, the roasting time was shorter and the ratio of residual bioactive substances readily decreased. When roasted specimens retained at least 80% of each of saponin and isoflavone and had a trypsin inhibitor activity of zero and a good flavor, they showed an L value of 25 to 35 and a b value of 5 to 13, irrespectively of the roasting temperature.

Example 3

Roasting was carried out under the same conditions as in Example 1 using the testae obtained in Example 1. Evaluations and measurements were made with the results shown in Table 4.

TABLE 4

| Roasting time (min) | L value | b value | Saponin | Isoflavone | Flavor |
|---|---|---|---|---|---|
| 0 | 63.51 | 19.58 | 100 | 100 | Bad (grassy smell) |
| 30 | 51.95 | 18.88 | 100 | 100 | Bad (grassy smell) |
| 60 | 42.74 | 17.57 | 100 | 100 | Bad (grassy smell) |
| 90 | 40.25 | 16.59 | 100 | 100 | Bad (slightly grassy smell) |
| 120 | 37.79 | 14.98 | 100 | 98 | Fair |
| 150 | 34.91 | 13.50 | 95 | 92 | Good |
| 180 | 34.19 | 13.12 | 95 | 90 | Good |
| 200 | 30.59 | 10.92 | 94 | 87 | Good |
| 220 | 29.35 | 8.75 | 92 | 85 | Good |
| 240 | 25.54 | 8.31 | 78 | 75 | Bad (burnt smell/bitterness) |

Mixtures were prepared by mixing various amounts of (i) the roasted hypocotyls obtained in Example 1 by roasting at 160° for 120 minutes and (ii) the roasted testate obtained by roasting at 160° for 180 minutes as shown in Table 4. The obtained mixtures had a mellow flavor, due to the presence of roasted testae, as compared with the roasted hypocotyls alone. Table 5 shows the amounts of the components and the results. The more the number of symbol + is, the higher the degree of mellowness is.

TABLE 5

| Roasted hypocotyls (wt %) | 100 | 80 | 60 | 40 | 20 |
|---|---|---|---|---|---|
| Roasted testae (wt %) | 0 | 20 | 40 | 60 | 80 |
| Degree of mellowness | + | ++ | +++ | +++ | +++ |

The absolute values of bioactive substances in the roasted testae were so low that as the amount of roasted testae increased, the amounts of bioactive substances decreased in the mixture. From the viewpoints of flavor and bioactive substances, an optimum weight ratio of roasted hypocotyls:roasted testae was 2:3 to 4:1.

Example 4

The hypocotyls obtained in Example 1 were compressed to a flat shape with a roller or crushed with a pulverizer. These hypocotyls were roasted in the same manner as in Example 1 and provided for evaluation. Extracted with hot water for comparison were the obtained roasted hypocotyls (compressed hypocotyls and pulverized hypocotyls) and the hypocotyls obtained in Example 1 and having the original shape (hereinafter called "whole"). The results are shown below in Table 6. All of said hypocotyls were zero in the trypsin inhibitor activity.

TABLE 6

| Roasting time (min) | L value | b value | Saponin | Isoflavone | Saponin extraction ratio (%) |
|---|---|---|---|---|---|
| 80 (whole) | 35.89 | 12.83 | 100 | 100 | |
| 90 (whole) | 32.76 | 9.92 | 95 | 95 | |
| 120 (whole) | 36.59 | 9.47 | 95 | 90 | 2.3% |
| 75 (flat pieces) | 35.78 | 12.77 | 100 | 95 | |
| 85 (flat pieces) | 32.24 | 9.87 | 95 | 90 | 30.8% |
| 110 (flat pieces) | 30.08 | 9.37 | 95 | 90 | |
| 70 (pulverized pieces) | 30.04 | 9.23 | 95 | 90 | 32.1% |

As shown above, the finer the hypocotyls are, the faster they produce the contemplated roasting color and the higher the roasting efficiency is. However, the pulverized hypocotyls require time and labor for preparation, necessitating higher costs. Further, the pulverized hypocotyls when used for beverage are of lower commercial value because of clogging a filter and containing precipitates at a higher content. The whole hypocotyls pose no problem when used alone as a food material and taken as a food, but are unable to be fully extracted with hot water when used as beverage materials. The compressed hypocotyls can be easily handled due to the shape of pellets and can be extracted with hot water in drinking applications. Hence the compressed hypocotyls has the most preferred shape.

Example 5

The hypocotyls obtained in Example 1 were used as those retaining the original shape (whole), as flattened pieces prepared by compression with a roller and as a powder obtained by crushing with a pulverizer. After roasting in the same manner as in Example 1, biscuits containing them were made. A group of panelists evaluated the biscuits and determined the ranking of desirable biscuits. The ranking was the biscuit containing the flattened pieces (top), the biscuit containing the powder (second) and the biscuit containing the whole (third). Some panelists remarked that the biscuit containing the powder was unsatisfactory in proper resistance to the teeth while the biscuit containing the whole was slightly hard when masticated.

Each biscuit comprised 200 parts by weight of wheat powder, 8 parts by weight of roasted hypocotyls, 12 parts by weight of roasted testae, 100 parts by weight of margarine and 70 parts by weight of sugar. These components were baked at 170° C. for 15 minutes.

Example 6

A 60 kg quantity of hypocotyls obtained in the same manner as in Example 1 was fed, as it was (whole), to a rotary gas roaster and roasted therein at 180° C. for 40 or 50 minutes. The color tone and isoflavone content were measured and the flavor was evaluated. The results are shown below in Table 7.

TABLE 7

| Roasting time (min) | L value | b value | Isoflavone | Trypsin inhibitor | Flavor |
|---|---|---|---|---|---|
| 40 | 30.01 | 6.41 | 60% | 0% | Very good |
| 50 | 25.88 | 4.44 | 56% | 0% | Fair (slightly burnt smell/bitterness) |

When hypocotyls roasted for 50 minutes weree used in a weight ratio of roasted hypocotyls:roasted barley of 3:2, the resulting mixture was good as a beverage material because the burnt smell and bitterness were subdued.

Example 7

A 50 kg quantity of soybeans were dried by hot air at 70° C. for 30 minutes to adjust the water content to 11%. The dried soybeans were heated by dry heat at a soybean temperature of 83° C. using a fluidized bed drier, and was immediately broken and hulled with a grinder useful for manufacture of bean curd (tofu) (product of Kurihara Tekko Co., Ltd.). One kilogram of hypocotyls was separated from soybeans by means of wind selection and sieve separation. The obtained hypocotyls were roasted with a gas roaster (product of Fuji Royal Co., Ltd.). The roasted hypocotyls had a color difference with an L value of 26.7 and b value of 5.84.

The roasted hypocotyls thus obtained were mixed with roasted germinated barley in the amounts shown in Table 8 (parts by weight of roasted germinated barley per part by weight of roasted hypocotyls) to make 10 g of a mixture. The mixture was placed into a tea bag and boiled with 1 liter of boiling water for 5 minutes. Then the obtained beverage was subjected-to an organoleptic test. Each sample was rated according to the following criteria: A (excellent), B (good), C (fair) and D (bad). The results are shown below in Table 8.

TABLE 8

| Item of organoleptic test | Amount of germinated barley (part by weight) | | | | |
| --- | --- | --- | --- | --- | --- |
| | 0.01 | 0.1 | 1 | 10 | 100 |
| Sweetness | C | C | C | C | D |
| Smell | C | B | B | B | B |
| Pleasant aroma | C | A | A | A | A |
| Astringent taste | D | C | C | C | C |

The results of Table 8 show that the beverage materials containing germinated barley and hypocotyls in a weight ratio of the former to the latter of 0.1–10:1 were good in sweetness, smell, pleasant aroma and astringent taste, and excellent particularly in pleasant aroma.

Example 8

The roasted hypocotyls obtained in the same manner as in Example 7 were mixed with roasted germinated naked barley in the amounts shown in Table 9 (parts by weight of roasted germinated naked barley per part by weight of roasted hypocotyls) to make 10 g of a mixture. The mixture was placed into a tea bag and boiled with 1 liter of boiling water for 5 minutes. Then the obtained beverage was subjected to the same organoleptic test as in Example 7. The results are shown below in Table 9.

TABLE 9

| Item of organoleptic test | Amount of germinated naked barley (part by weight) | | | | |
| --- | --- | --- | --- | --- | --- |
| | 0.01 | 0.1 | 1 | 10 | 100 |
| Sweetness | C | C | C | C | D |
| Smell | C | B | B | B | B |

TABLE 9-continued

| Item of organoleptic test | Amount of germinated naked barley (part by weight) | | | | |
| --- | --- | --- | --- | --- | --- |
| | 0.01 | 0.1 | 1 | 10 | 100 |
| Pleasant aroma | C | A | A | A | A |
| Astringent taste | D | C | C | C | C |

The results of Table 9 show that the beverage materials containing germinated naked barley and hypocotyls in a weight ratio of the former to the latter of 0.1–10:1 were superior in sweetness, smell, pleasant aroma and astringent taste, and excellent particularly in pleasant aroma.

Example 9

The roasted hypocotyls obtained in the same manner as in Example 7 were mixed with roasted germinated Job's-tears in the amounts shown in Table 10 (parts by weight of roasted germinated Job's-tears per part by weight of roasted hypocotyls) to make 10 g of a mixture. The mixture was placed into a tea bag and boiled with 1 liter of boiling water for 5 minutes. Then the obtained beverage was subjected to the same organoleptic test as in Example 7. The results are shown below in Table 10.

TABLE 10

| Item of organoleptic test | Amount of germinated Job's-tears (part by weight) | | | | |
| --- | --- | --- | --- | --- | --- |
| | 0.01 | 0.1 | 1 | 10 | 100 |
| Sweetness | C | C | C | C | D |
| Smell | C | A | A | A | A |
| Pleasant aroma | C | B | B | B | B |
| Astringent taste | D | C | C | C | C |

The results of Table 10 show that the beverage materials containing germinated Job's-tears and hypocotyls in a weight ratio of the former to the latter of 0.1–10:1 were good in sweetness, smell, pleasant aroma and astringent taste, and excellent particularly in smell.

Example 10

The roasted hypocotyls obtained in the same manner as in Example 7 were mixed with green tea in the amounts shown in Table 11 (parts by weight of green tea per part by weight of roasted hypocotyls) to make 10 g of a mixture. The mixture was placed into a tea bag and boiled with 1 liter of boiling water for 5 minutes. Then the obtained beverage was subjected to the same organoleptic test as in Example 7. The results are shown below in Table 11.

TABLE 11

| Item of organoleptic test | Amount of green tea (weight part) | | | | | | |
| --- | --- | --- | --- | --- | --- | --- | --- |
| | 0.0001 | 0.001 | 0.01 | 0.1 | 1 | 10 | 100 |
| Sweetness | C | B | B | B | C | C | D |
| Smell | C | B | B | B | B | B | B |

TABLE 11-continued

| Item of organoleptic | Amount of green tea (weight part) | | | | | | |
|---|---|---|---|---|---|---|---|
| test | 0.0001 | 0.001 | 0.01 | 0.1 | 1 | 10 | 100 |
| Pleasant aroma | C | C | C | C | C | C | D |
| Astringent taste | D | A | A | A | A | A | A |

The results of Table 11 show the following. The beverage materials containing green tea and hypocotyls in a weight ratio of the former to the latter of 0.001–0.1:1 were good in sweetness, smell, pleasant aroma and astringent taste, and excellent particularly in the effect of masking the oral remainder of sweetness peculiar to hypocotyls as well as in astringent taste. The beverage materials containing green tea and hypocotyls in a ratio of the former to the latter of more than 0.1-less than 10:1 were good in sweetness, smell, pleasant aroma and astringent taste, particularly excellent in astringent taste.

Example 11

The roasted hypocotyls obtained in the same manner as in Example 7 were mixed with 0.5 part by weight of roasted germinated naked barley and 0.5 part by weight of roasted germinated Job's-tears, both per part by weight of roasted hypocotyls to make 10 g of a mixture. The mixture was placed into a tea bag and boiled with 1 liter of boiling water for 5 minutes. Then the obtained beverage was subjected to the same organoleptic test as in Example 7.

Example 12

The roasted hypocotyls obtained in the same manner as in Example 7 were mixed with one part by weight of roasted germinated naked barley and 0.01 part by weight of green tea, both per part by weight of roasted hypocotyls to make 10 g of a mixture. The mixture was placed into a tea bag and boiled with 1 liter of boiling water for 5 minutes. Then the obtained beverage was subjected to the same organoleptic test as in Example 7.

Example 13

The roasted hypocotyls obtained in the same manner as in Example 7 were mixed with one part by weight of roasted germinated Job's-tears and 0.01 part by weight of green tea, both per part by weight of roasted hypocotyls to make 10 g of a mixture. The mixture was placed into a tea bag and boiled with 1 liter of boiling water for 5 minutes. Then the obtained beverage was subjected to the same organoleptic test as in Example 7.

Example 14

One part by weight of the roasted hypocotyls obtained in the same manner as in Example 7 was mixed with 0.5 part by weight of roasted germinated naked barley, 0.5 part by weight of roasted germinated Job's-tears and 0.01 part by weight of green tea, all per part by weight of roasted hypocotyls to make 10 g of a mixture. The mixture was placed into a tea bag and boiled with 1 liter of boiling water for 5 minutes. Then the obtained beverage was subjected to the same organoleptic test as in Example 7.

Example 15

The roasted hypocotyls obtained in the same manner as in Example 7 were mixed with 0.34 part by weight of roasted germinated naked barley, 0.46 part by weight of roasted germinated Job's-tears, 0.01 part by weight of green tea, 0.1 part by weight of cassia seed, 0.08 part by weight of lycium leaves and 0.01 part by weight of bamboo leaves, all per part by weight of roasted hypocotyls to make 10 g of a mixture. The mixture was placed into a tea bag and boiled with 1 liter of boiling water for 5 minutes. Then the obtained beverage was subjected to the same organoleptic test as in Example 7.

Table 12 show the results of organoleptic tests of Examples 11 to 15.

TABLE 12

| Item of organoleptic test | Example | | | | |
|---|---|---|---|---|---|
| | 11 | 12 | 13 | 14 | 15 |
| Sweetness | C | B | B | B | A |
| Smell | A | B | A | A | A |
| Pleasant aroma | A | A | B | A | A |
| Astringent taste | C | A | A | A | A |

The results of Table 12 show the following. The beverage materials having any of the compositions were superior in sweetness, smell, pleasant aroma and astringent taste. Among them, the beverage material containing roasted germinated naked barley and roasted germinated Job's-tears was excellent especially in smell and pleasant aroma (Example 11). The beverage material containing roasted germinated naked barley and green tea was excellent especially in pleasant aroma and astringent taste (Example 12). The beverage material containing roasted germinated Job's-tears and green tea was excellent especially in smell and astringent taste (Example 13). The beverage material containing roasted germinated naked barley, roasted germinated Job's-tears and green tea was excellent especially in sweetness-masking effect, smell, pleasant aroma and astringent taste (Example 14). The beverage material containing roasted germinated naked barley, roasted germinated Job's-tears, green tea, cassia seed, lycium leaves and bamboo leaves was excellent in all of sweetness, smell, pleasant aroma and astringent taste (Example 15).

Example 16

The same components as in Examples 7–15 were mixed together in the same proportions by the same processes to make 10 g of each mixture. Each mixture was placed into a tea bag, and was dipped in 500 ml of hot water for 2 to 3 minutes. These mixtures gave the same results as in Examples 7 to 15. A 3 g portion of the total amount of each mixture was placed into a small-size tea bag and was dipped in 100 ml of hot water for 1 to 2 minutes. The obtained beverages achieved the same results as in Examples 7 to 15.

Comparative Example 1

Into each tea bag was placed 10 g of each of the roasted hypocotyls obtained in the same manner as in Example 7, roasted germinated naked barley, roasted germinated Job's-tears and green tea. Each component in the bag was boiled with 1 liter of boiling water for 5 minutes. The same organoleptic test as in Example 7 was carried out. The results of the test are shown in Table 13.

TABLE 13

| Item of organoleptic test | Soybean hypocotyl | Germinated barley | Germinated naked barley | Germinated Job's-tears | Green tea |
|---|---|---|---|---|---|
| Sweetness | C | D | D | D | D |
| Smell | C | B | B | A | B |
| Pleasant aroma | C | A | A | B | D |
| Astringent taste | D | C | C | C | A |

The above results of Table 13 show the following. When roasted hypocotyls, roasted germinated naked barley, roasted germinated Job's-tears and green tea were individually used, each component was not properly balanced in sweetness, smell, pleasant aroma and astringent taste, and unsatisfactory in the flavor.

We claim:

1. A beverage material comprising (i) roasted soybean hypocotyls which are roasted separately and substantially free of soybean testae, said roasted soybean hypocotyls are 25 to 35 in L value and 4 to 13 in b value when measured with a color difference meter and (ii) at least one member selected from the group consisting of roasted soybean testae, roasted barley, roasted naked barley, roasted Job's-tears and green tea.

2. The beverage material according to claim 1, wherein the roasted soybean testae are 28 to 35 in L value and 8.5 to 15 in b value when measured with a color difference meter.

3. The beverage material according to claim 2 which comprises roasted hypocotyls which are roasted separately and substantially free of soybean testae and roasted testae, the amount of roasted testae being 4 parts by weight or less per part by weight of roasted hypocotyls.

4. The beverage material according to claim 1 which comprises roasted hypocotyls, and at least one member selected from the group consisting of roasted barley and roasted naked barley, the amount of the selected member being 0.1 to 10 parts by weight per part by weight of roasted hypocotyls.

5. The beverage material according to claim 1 which comprises roasted hypocotyls and roasted Job's-tears, the amount of roasted Job's-tears being 0.1 to 10 parts by weight per part by weight of roasted hypocotyls.

6. The beverage material according to claim 1 which comprises roasted hypocotyls and green tea, the amount of green tea being 0.001 to 10 parts by weight per part by weight of roasted hypocotyls.

7. The beverage material according to claim 1 which comprises roasted hypocotyls and, per part by weight of roasted hypocotyls, 0.1 to 10 parts by weight of at least one selected from the group consisting of roasted barley and roasted naked barley and 0.1 to 10 parts by weight of roasted Job's-tears.

8. The beverage material according to claim 1 which comprises roasted hypocotyls and, per part by weight of roasted hypocotyls, 0.1 to 10 parts by weight of at least one selected from the group consisting of roasted barley and roasted naked barley and 0.001 to 10 parts by weight of green tea.

9. The beverage material according to claim 1 which comprises roasted hypocotyls and roasted Job's-tears, the amount of roasted Job's-tears being 0.1 to 10 parts by weight per part by weight of roasted hypocotyls.

10. The beverage material according to claim 1 which comprises roasted hypocotyls and, per part by weight of roasted hypocotyls, 0.1 to 10 parts by weight of at least one selected from the group consisting of roasted barley and roasted naked barley, 0.1 to 10 parts by weight of roasted Job's-tears and 0.001 to 10 parts by weight of green tea.

11. The beverage material according to claim 1 which comprises roasted hypocotyls and, per part by weight of roasted hypocotyls, 0.1 to 10 parts by weight of at least one selected from the group consisting of roasted barley and roasted naked barley, 0.1 to 10 parts by weight of roasted Job's-tears, and 0.1 to 10 parts by weight of green tea.

12. The beverage material according to claim 10 which further comprises 0.001 to 10 parts by weight of at least one member selected from the group consisting of cassia seed, lycium leaves and bamboo leaves.

\* \* \* \* \*